A. C. Teel.
Farm Gate.
No. 40,777. Patented Dec. 1. 1863.

WITNESSES

INVENTOR

UNITED STATES PATENT OFFICE.

A. C. TEEL, OF GIRARD, ILLINOIS.

IMPROVEMENT IN FARM-GATES.

Specification forming part of Letters Patent No. 40,777, dated December 1, 1863.

*To all whom it may concern:*

Be it known that I, A. C. TEEL, of Girard, in the county of Macoupin and State of Illinois, have invented a new and useful Improvement in Hanging Gates; and I do hereby declare that the following is a full, clear, and exact description of the same, reference being had to the accompanying drawings, making a part of this specification, in which—

Figure 1:
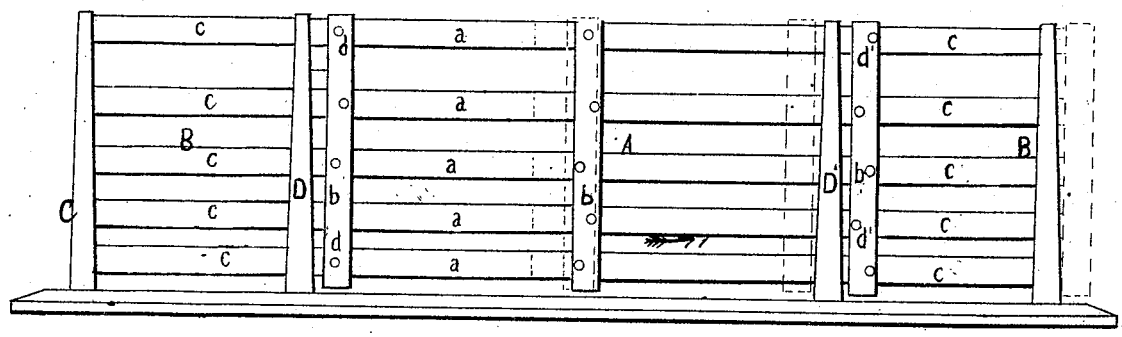
Figure 2:
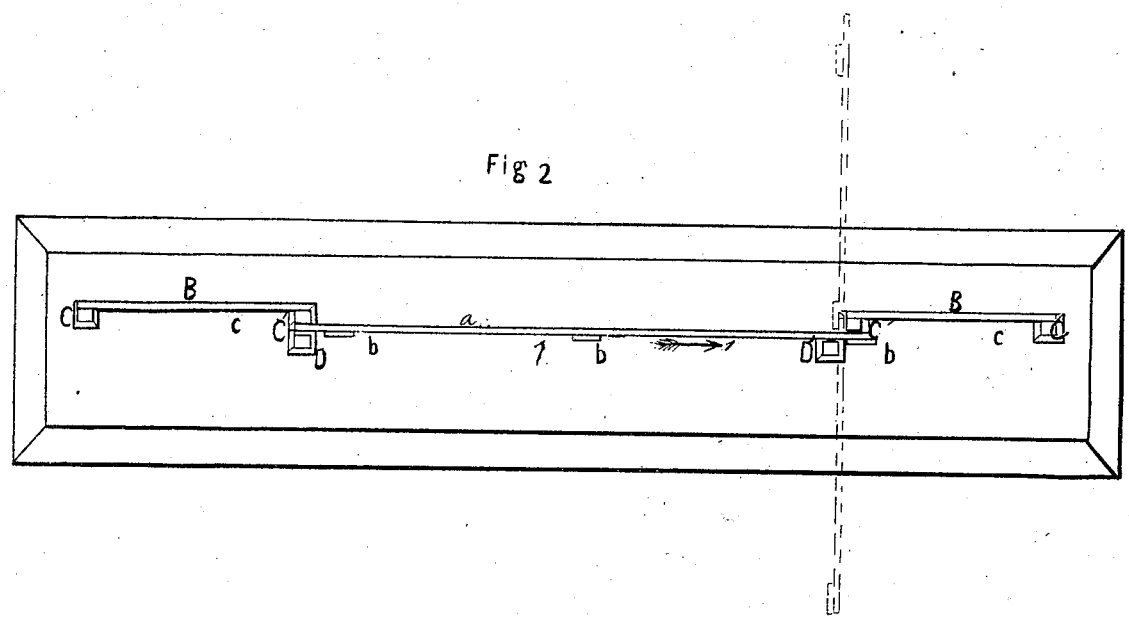

Figure 1 is a side view of my invention; Fig. 2, a plan or top view of the same.

Similar letters of reference indicate corresponding parts in the two figures.

This invention consists in a novel way of hanging gates, whereby the use of hinges is dispensed with, and the gate at the same time rendered capable of being opened and closed with equally as great facility as if it were hung upon hinges, the expense of the latter being therefore avoided without any disadvantage whatever.

To enable those skilled in the art to fully understand and construct my invention, I will proceed to describe it.

A represents the gate, which may be constructed of horizontal slats $a$, nailed or otherwise secured to vertical battens $b$.

B B represent the ends of the face, the space between which is closed by the gate when the latter is shut.

This fence may be constructed of horizontal slats $c$, nailed to posts C C', and by the side of each outer post, C', of the ends B B of the fence there are placed posts D D', as shown clearly in Fig. 2, the post D' being placed rather beyond the line of the post C', which it is near, so as to admit of the slats $a$ of the gate fitting between them at right angles to the ends B B of the fence, as shown in red in Fig. 2. The other post, D, is in line with its post C, as is also shown in Fig. 2. Between the posts D' and C' there are two strips, $d'$, on which the upper slat, $a$, of the gate rests, and similar strips, $d$, are attached to the posts C D at the opposite end of the gate. The strips $d'$ are within the end batten, $b$, of the gate. The strips $d$ $d'$ support the gate, and the latter is retained in proper position by the posts C' D C' D'.

In order to open the gate it is first shoved longitudinally in the direction of arrow 1, until its central batten, $b$, comes in contact with the post D', and the gate, being then in a balance state on the strips $d'$, is readily turned around in a position at right angles to the fence B B, as shown in red in Fig. 2. By this simple arrangement it will be seen that the use of hinges is dispensed with, and still the gate rendered capable of being opened and closed with the greatest facility.

Having thus described my invention, what I claim as new, and desire to secure by Letters Patent, is—

The suspending of the gate A on strips $d$ $d'$, attached to posts C' D C' D' at the ends B B of the fence, substantially as shown, to admit of the sliding of the gate and the turning of the same for the purpose of opening and closing it, as herein set forth.

A. C. TEEL.

Witnesses:
L. A. EVERTS,
MILTON RANDALL.